Aug. 14, 1923.
J. F. RICHTER
TIRE STITCHER
Filed March 7, 1922
1,465,177
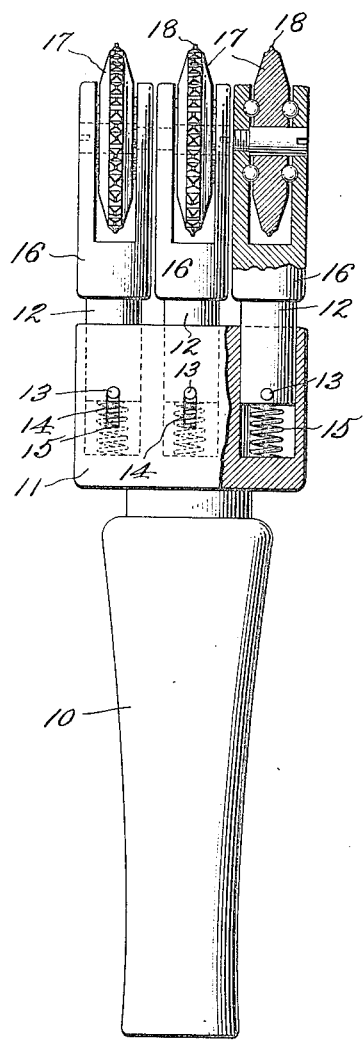
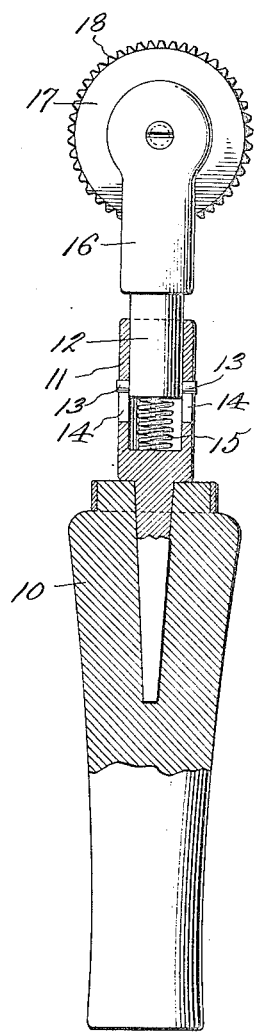
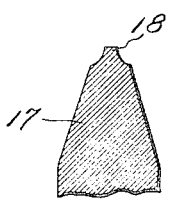
J. F. Richter
INVENTOR
BY Victor J. Evans
ATTORNEY
WITNESSES Patented Aug. 14, 1923.

1,465,177

UNITED STATES PATENT OFFICE.

JOSEPH F. RICHTER, OF HARDIN, MONTANA.

TIRE STITCHER.

Application filed March 7, 1922. Serial No. 541,771.

*To all whom it may concern:*

Be it known that I, JOSEPH F. RICHTER, a citizen of the United States, residing at Hardin, in the county of Big Horn and State of Montana, have invented new and useful Improvements in Tire Stitchers, of which the following is a specification.

This invention comprehends the provision of a tool in the nature of a tire stitcher, the tool being designed to not only facilitate its use, but by means of which a greater amount of work in a given time may be accomplished, and at the same time producing more efficient work as compared to the old style tool.

In carrying out the invention, I make use of a plurality of toothed wheels, the teeth of which being shaped to not only penetrate the rubber and release air bubbles that cause blemishes on cured tires, but they also serve to effectively compress the rubber so that it will properly adhere to the rubber beneath.

Another object of importance, resides in the provision of a tool of the above mentioned character, wherein the wheels are independently mounted in suitable bearings, each of which include a spring pressed plunger, to allow the wheels to follow the curvature of the tire, dip into the depressions, and at the same time allow certain wheels to stitch the high spots or elevations all in the one motion of the arm.

Other advantages will appear when the following detailed description is read in connection with the accompanying drawing, the invention residing in the construction, combination and arrangement of parts as claimed.

In the drawing forming part of this application, like numerals of reference indicate similar parts in the several views, and wherein:—

Figure 1 is a view in elevation of the tool constructed in accordance with the invention.

Figure 2 is a sectional view taken on line 2—2 of Figure 1.

Figure 3 is a perspective view of one of the wheels and its plunger.

Referring to the drawing in detail, 10 indicates a handle at one end of which is supported an oblong casing 11, which together with the handle may be constructed of any suitable material and also vary in size without departing from the spirit of the invention. The casing 11 is bored to accommodate the plungers 12, the latter being slidable within the casing, and guided in their movements through the instrumentality of pins 13, which project from each plunger, and operate in the slots 14 arranged in the opposed walls of the casing. In each bore of the casing is a coiled spring or other yieldable element 15 against the tension of which the plungers move inwardly. The plungers are independently operable or movable for the purpose to be presently described, each plunger supporting a yoke 16 which constitutes a bearing for one of the toothed wheels 17. One or any number of these wheels may be used, but each wheel is formed with teeth 18 of a particular shape for the accomplishment of most efficient work. In other words, the teeth are sharpened sufficiently to penetrate the rubber and thus release air bubbles that frequently cause blemishes on cured tires, and at the same time each tooth is provided with a head or shoulder of a sufficient size to effectively compress the rubber firmly against the rubber beneath, and in this manner, the rubber will be stitched, or made to adhere together more compactly, making a better surface on the tire before being put into the molds, and consequently, a better finished job after coming out of the molds being cured. The construction in its entirety affords the tool considerable weight, so that it can be easily moved over smooth surfaces with rigidity, and accomplishes its work with fewer arm motions.

By reason of the fact that the plungers are independently movable within the casing against the tension of the springs therein, the wheels are allowed to follow the curvature of the tire, permitting one or more wheels to dip into the depressions, and at the same time allow the remaining wheel or wheels to stitch the high spots or elevations all in the one motion of the arm. The wheels are provided with suitable bearings to minimize friction.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A tool of the character described comprising a handle, a casing supported at one end of the handle and having a bore, a plunger slidable within said bore, a spring arranged within the bore and acting against said plunger, and a toothed wheel journaled on said plunger for the purpose specified.

2. A tool of the character described comprising a handle, a casing supported by one end thereof and having a plurality of bores, plungers independently movable within said bores, a spring in each bore acting against the adjacent plunger, and a toothed wheel journaled on each plunger for the purpose specified.

3. A tool of the character described comprising a handle, a casing supported by one end thereof, a plurality of spring pressed plungers independently movable within the casing, a yoke on the outer end of each plunger, a toothed wheel journaled in each yoke, and the teeth of each wheel being sharpened to an approximately fine point, and a shoulder on each tooth for the purpose specified.

4. A tool of the character described comprising a handle, a casing supported by one end of the handle, a plurality of spring pressed plungers movable within the casing, the opposed walls of the casing having slots, a pin carried by each plunger and operating in said slots, a yoke on the outer end of each plunger, and a toothed wheel journaled in said yoke for the purpose specified.

In testimony whereof I affix my signature.

JOSEPH F. RICHTER.